(12) United States Patent
Shimohira et al.

(10) Patent No.: US 8,244,420 B2
(45) Date of Patent: Aug. 14, 2012

(54) VEHICLE, VEHICLE CONTROL METHOD, AND DRIVE UNIT

(75) Inventors: Takahiro Shimohira, Toyota (JP); Ryo Shimizu, Okazaki (JP); Hideki Furuta, Nukata-gun (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 488 days.

(21) Appl. No.: 12/471,807

(22) Filed: May 26, 2009

(65) Prior Publication Data

US 2009/0299559 A1 Dec. 3, 2009

(30) Foreign Application Priority Data

May 27, 2008 (JP) .................................. 2008-138235

(51) Int. Cl.
*B60L 11/00* (2006.01)
(52) U.S. Cl. ................ 701/22; 701/36; 701/45; 701/51; 701/65; 701/68; 701/70; 701/71; 701/82; 701/84; 701/90
(58) Field of Classification Search .................... None
See application file for complete search history.

(56) References Cited

U.S. PATENT DOCUMENTS

| 5,841,201 A * | 11/1998 | Tabata et al. ................ 290/40 C |
| 5,842,534 A * | 12/1998 | Frank .......................... 180/65.25 |
| 5,899,953 A * | 5/1999 | Urahashi ....................... 701/117 |
| 5,931,757 A * | 8/1999 | Schmidt ............................ 475/2 |
| 6,098,733 A * | 8/2000 | Ibaraki et al. ............... 180/65.28 |
| 6,520,879 B2 * | 2/2003 | Kawabata et al. ................ 475/5 |
| 6,554,088 B2 * | 4/2003 | Severinsky et al. ......... 180/65.23 |
| 6,719,076 B1 * | 4/2004 | Tabata et al. ................. 180/65.7 |
| 6,832,148 B1 * | 12/2004 | Bennett et al. ................... 701/54 |
| 6,962,224 B2 * | 11/2005 | Nakanowatari .......... 180/65.225 |
| 7,273,120 B2 * | 9/2007 | Tabata ....................... 180/65.265 |
| 7,672,770 B2 * | 3/2010 | Inoue et al. ...................... 701/70 |
| 8,027,773 B2 * | 9/2011 | Ahn ................................. 701/70 |
| 2002/0061802 A1 * | 5/2002 | Chung ............................... 477/3 |
| 2002/0061803 A1 * | 5/2002 | Aoki ................................. 477/3 |
| 2004/0220015 A1 * | 11/2004 | Murakami et al. .............. 477/15 |
| 2005/0080523 A1 * | 4/2005 | Bennett et al. .................. 701/22 |
| 2005/0203680 A1 * | 9/2005 | Hisada et al. ................... 701/22 |
| 2006/0036357 A1 * | 2/2006 | Isono et al. ..................... 701/22 |

(Continued)

FOREIGN PATENT DOCUMENTS

JP 2000-125405 A 4/2000

(Continued)

*Primary Examiner* — Jonathan M Dager
(74) *Attorney, Agent, or Firm* — Kenyon & Kenyon LLP (57) ABSTRACT

If an accelerator pedal is released, when a flag indicates 1, a vehicle travels in a traveling environment reflected operation mode where an engine and two motors are controlled in a manner that a required torque is output to a drive shaft while the engine is operated by the motor. If a vehicle speed is equal to or lower than a threshold at the time or after the flag is changed from 1 to 0, the vehicle travels in a normal operation mode where the engine and two motors are controlled in a manner that the required torque is output to the drive shaft with engine rotation stopped. If the vehicle speed is higher than the threshold when the flag is changed from 1 to 0, the vehicle travels in the traveling environment reflected operation mode until the vehicle speed becomes equal to or lower than the threshold.

9 Claims, 7 Drawing Sheets

U.S. PATENT DOCUMENTS

| | | | |
|---|---|---|---|
| 2006/0175102 A1* | 8/2006 | Imazu | 180/65.2 |
| 2006/0195242 A1* | 8/2006 | Yamamoto et al. | 701/51 |
| 2006/0231306 A1* | 10/2006 | Severinsky et al. | 180/65.2 |
| 2006/0289212 A1* | 12/2006 | Haruhisa | 180/65.2 |
| 2007/0241611 A1* | 10/2007 | Shimada et al. | 303/152 |
| 2007/0255478 A1* | 11/2007 | Wakashiro et al. | 701/93 |
| 2007/0275808 A1* | 11/2007 | Iwanaka et al. | 475/5 |
| 2007/0275819 A1* | 11/2007 | Hirata | 477/5 |
| 2007/0298928 A1* | 12/2007 | Yamanaka et al. | 477/15 |
| 2008/0004780 A1* | 1/2008 | Watanabe et al. | 701/54 |
| 2008/0207374 A1* | 8/2008 | Iwanaka et al. | 475/5 |
| 2008/0228334 A1* | 9/2008 | Hashimoto | 701/22 |
| 2008/0234915 A1* | 9/2008 | Nomasa et al. | 701/102 |
| 2008/0236912 A1* | 10/2008 | Ueoka et al. | 180/65.2 |
| 2008/0262667 A1* | 10/2008 | Otabe | 701/22 |
| 2008/0300766 A1* | 12/2008 | Kumabe et al. | 701/98 |
| 2008/0319601 A1* | 12/2008 | Komeda et al. | 701/29 |

FOREIGN PATENT DOCUMENTS

| | | |
|---|---|---|
| JP | 2006-256595 A | 9/2006 |
| JP | 2007-309475 A | 11/2007 |
| JP | 2007-331503 A | 12/2007 |

* cited by examiner

VEHICLE, VEHICLE CONTROL METHOD, AND DRIVE UNIT

INCORPORATION BY REFERENCE

The disclosure of Japanese Patent Application No. 2008-138235 filed on May 27, 2008 including the specification, drawings and abstract is incorporated herein by reference in its entirety.

BACKGROUND OF THE INVENTION

1. Field of the Invention

The invention relates to a vehicle, a vehicle control method, and a drive unit.

2. Description of the Related Art

For example, Japanese Patent Application Publication No. 2007-309475 (JP-A-2007-309475) describes a vehicle which includes an engine and an automatic transmission that transfers the power from the engine to drive wheels while changing the speed of rotation transferred from the engine, and in which a shift manner for the automatic transmission set in advance based on a traveling environment, an operation etc. is changed. In this vehicle, the shift manner is changed, for example, when the vehicle travels an uphill slope, the vehicle goes round a curve, or when an accelerator pedal is suddenly depressed, so that a drive mode (e.g. engine braking) which suits the intension of a driver is achieved.

In a vehicle that includes an engine, an electric power/power reception/output unit that is connected to an axle-side shaft and an output shaft of the engine in such a manner that the electric power/power reception/output unit may rotate independently of the axle-side shaft, an electric motor that receives power from the axle-side shaft or outputs power to the axle-side shaft, it is desired that a drive mode which suits the intention of a driver is achieved, for example, when the vehicle travels on an uphill slope, the vehicle goes round a curve, or when an accelerator pedal is suddenly depressed, and that the mode is changed from the drive mode to another mode at appropriate timing by controlling the engine, the electric power/power reception output unit, and the electric motor with the fuel efficiency taken into account.

SUMMARY OF THE INVENTION

The invention provides a vehicle, a vehicle control method, and a drive unit that make it possible to achieve a mode in which a control is executed over an internal combustion engine, an electric power/power reception/output unit, and an electric motor with a traveling environment taken into account when a traveling environmental condition is satisfied, and to change the mode to another mode at appropriate timing by controlling the internal combustion engine, the electric power/power reception/output unit, and the electric motor with the fuel efficiency taken into account.

A vehicle, a vehicle control method and a drive unit according to the invention will be described below.

A first aspect of the invention relates to a vehicle that includes: an internal combustion engine; an electric power storage unit; an electric power/power reception/output unit that is connected to an axle-side shaft and connected to an output shaft of the internal combustion engine in such a manner that the electric power/power reception/output unit rotates independently of the axle-side shaft, and that receives power from the output shaft and outputs the power to the axle-side shaft or receives power from the axle-side shaft and outputs the power to the output shaft while exchanging electric power with the electric power storage unit and exchanging power with the internal combustion engine; an electric motor that receives power from the axle-side shaft or outputs power to the axle-side shaft, and that exchanges electric power with the electric power storage unit; a vehicle speed detection unit that detects a vehicle speed; and a control unit. If a traveling environmental condition that is related to an environment in which the vehicle travels is satisfied, the control unit executes a traveling environment reflected control in which the internal combustion engine, the electric power/power reception/output unit, and the electric motor are controlled in such a manner that the vehicle is driven by a driving force based on a required driving force, which is required to drive the vehicle, with the traveling environment taken into account more significantly than in a normal control in which the internal combustion engine, the electric power/power reception/output unit and the electric motor are controlled in such a manner that the vehicle is driven by the driving force based on the required driving force with fuel efficiency taken into account. If the detected vehicle speed is equal to or lower than a predetermined vehicle speed at the time or after the traveling environmental condition fails to be satisfied, the control unit executes the normal control. If the detected vehicle speed is higher than the predetermined vehicle speed when the traveling environmental condition fails to be satisfied, the control unit executes the traveling environment reflected control until the vehicle speed becomes equal to or lower than the predetermined vehicle speed.

In the vehicle according to the first aspect of the invention, if the traveling environmental condition that is related to the environment in which the vehicle travels is satisfied, the control unit executes the traveling environment reflected control in which the internal combustion engine, the electric power/power reception/output unit, and the electric motor are controlled in such a manner that the vehicle is driven by the driving force based on the required driving force, which is required to drive the vehicle, with the traveling environment taken into account more significantly than in a normal control in which the internal combustion engine, the electric power/power reception/output unit and the electric motor are controlled in such a manner that the vehicle is driven by the driving force based on the required driving force with fuel efficiency taken into account. Thus, it is possible to execute the control in which the traveling environment is taken into account more significantly than in the normal control. If the detected vehicle speed is equal to or lower than the predetermined vehicle speed at the time or after the traveling environmental condition fails to be satisfied, the control unit executes the normal control. Thus, it is possible to execute the control in which the fuel efficiency is taken into account. If the detected vehicle speed is higher than the predetermined vehicle speed when the traveling environmental condition fails to be satisfied, the control unit executes the traveling environment reflected control until the vehicle speed becomes equal to or lower than the predetermined vehicle speed. Thus, it is possible to avoid the inconveniences that may occur if the control is switched from the traveling environment reflected control to the normal control when the vehicle travels at a relatively high vehicle speed. Accordingly, it is possible to switch the control from the traveling environment reflected control to the normal control at more appropriate timing which is at the time that or after the traveling environmental condition fails to be satisfied. The traveling environmental condition may be a condition that is satisfied at least when the vehicle travels on a slope or when the vehicle goes round a curve. The predetermined vehicle speed may be a vehicle speed within a vehicle speed range in which rotation of the internal combustion engine is permitted to be stopped when the normal control is executed.

In the vehicle according to the first aspect of the invention, when the control unit executes the traveling environment reflected control, the control unit may control the internal combustion engine, the electric power/power reception/output unit and the electric motor in such a manner that the vehicle is driven by the driving force based on the required driving force with rotation of the internal combustion engine continued, and when the control unit executes the normal control, the control unit may control the internal combustion engine, the electric power/power reception/output unit and the electric motor in such a manner that the vehicle is driven by the driving force based on the required driving force with the internal combustion engine operated intermittently. In the vehicle according to the first aspect of the invention, if the required driving force is a braking force, when the control unit executes the traveling environment reflected control, the control unit may control the internal combustion engine, the electric power/power reception/output unit and the electric motor in such a manner that the vehicle is driven by the driving force based on the required driving force in the state where the internal combustion engine, in which fuel injection is stopped, is operated by the electric power/power reception/output unit, and if the required driving force is a braking force, when the control unit executes the normal control, the control unit may control the internal combustion engine, the electric power/power reception/output unit and the electric motor in such a manner that the vehicle is driven by the driving force based on the required driving force with rotation of the internal combustion engine stopped. Thus, if the required driving force is a braking force, when the traveling environment reflected control is executed, a braking force is applied to the axle-side shaft by operating the internal combustion engine with the use of the electric power/power reception/output unit. If the required driving force is a braking force, when the normal control is executed, it is possible to suppress the amount of electric power that is consumed when the internal combustion engine is operated by the electric power/power reception/output unit. As a result, the energy efficiency is improved. In the vehicle according to the first aspect of the invention, if an accelerator pedal is released, the control unit may control the internal combustion engine, the electric power/power reception/output unit and the electric motor in such a manner that the vehicle is driven by the driving force based on the required driving force which tends to be larger as a braking force when the traveling environment reflected control is executed than when the normal control is executed.

In the vehicle according to the first aspect of the invention, the electric power/power reception/output unit may include an electric motor which receives or outputs power and a three-axis power reception/output unit that is connected to three shafts which are the axle-side shaft, the output shaft, and a rotating shaft of the electric motor, and that receives or outputs, based on power received from or output to any two of the three shafts, power from or to the remaining shaft.

A second aspect of the invention relates to a drive unit that is mounted together with an internal combustion engine and a storage unit in a vehicle. The drive unit includes: an electric power/power reception/output unit that is connected to an axle-side shaft and connected to an output shaft of the internal combustion engine in such a manner that the electric power/power reception/output unit rotates independently of the axle-side shaft, and that receives power from the output shaft and outputs the power to the axle-side shaft or receives power from the axle-side shaft and outputs the power to the output shaft while exchanging electric power with the electric power storage unit and exchanging power with the internal combustion engine; an electric motor that exchanges electric power with the electric power storage unit and that receives power from the axle-side shaft or outputs power to the axle-side shaft; and a control unit. If a traveling environmental condition that is related to an environment in which the vehicle travels is satisfied, the control unit executes a traveling environment reflected control in which the internal combustion engine, the electric power/power reception/output unit, and the electric motor are controlled in such a manner that the vehicle is driven by a driving force based on a required driving force, which is required to drive the vehicle, with the traveling environment taken into account more significantly than in a normal control in which the internal combustion engine, the electric power/power reception/output unit and the electric motor are controlled in such a manner that the vehicle is driven by the driving force based on the required driving force with fuel efficiency taken into account. If the detected vehicle speed is equal to or lower than a predetermined vehicle speed at the time or after the traveling environmental condition fails to be satisfied, the control unit executes the normal control. If the detected vehicle speed is higher than the predetermined vehicle speed when the traveling environmental condition fails to be satisfied, the control unit executes the traveling environment reflected control until the vehicle speed becomes equal to or lower than the predetermined vehicle speed.

In the drive unit according to the second aspect of the invention, if the traveling environmental condition that is related to the environment in which the vehicle travels is satisfied, the control unit executes the traveling environment reflected control in which the internal combustion engine, the electric power/power reception/output unit, and the electric motor are controlled in such a manner that the vehicle is driven by the driving force based on the required driving force, which is required to drive the vehicle, with the traveling environment taken into account more significantly than in a normal control in which the internal combustion engine, the electric power/power reception/output unit and the electric motor are controlled in such a manner that the vehicle is driven by the driving force based on the required driving force with fuel efficiency taken into account. Thus, it is possible to execute the control in which the traveling environment is taken into account more significantly than in the normal control. If the detected vehicle speed is equal to or lower than the predetermined vehicle speed at the time or after the traveling environmental condition fails to be satisfied, the control unit executes the normal control. Thus, it is possible to execute the control in which the fuel efficiency is taken into account. If the detected vehicle speed is higher than the predetermined vehicle speed when the traveling environmental condition fails to be satisfied, the control unit executes the traveling environment reflected control until the vehicle speed becomes equal to or lower than the predetermined vehicle speed. Thus, it is possible to avoid the inconveniences that may occur if the control is switched from the traveling environment reflected control to the normal control when the vehicle travels at a relatively high vehicle speed. Accordingly, it is possible to switch the control from the traveling environment reflected control to the normal control at more appropriate timing which is at the time that or after the traveling environmental condition fails to be satisfied. The traveling environmental condition may be a condition that is satisfied at least when the vehicle travels on a slope or when the vehicle goes round a curve. The predetermined vehicle speed may be a vehicle speed within a vehicle speed range in, which rotation of the internal combustion engine is permitted to be stopped when the normal control is executed.

A third aspect of the invention relates to a method for controlling a vehicle that includes an internal combustion engine, an electric power storage unit, an electric power/power reception/output unit that is connected to an axle-side shaft and connected to an output shaft of the internal combustion engine in such a manner that the electric power/power reception/output unit rotates independently of the axle-side shaft, and that receives power from the output shaft and outputs the power to the axle-side shaft or receives power from the axle-side shaft and outputs the power to the output shaft while exchanging electric power with the electric power storage unit and exchanging power with the internal combustion engine, and an electric motor that receives power from the axle-side shaft or outputs power to the axle-side shaft, and that exchanges electric power with the electric power storage unit. According to the method, if a traveling environmental condition that is related to an environment in which the vehicle travels is satisfied, a traveling environment reflected control is executed in which the internal combustion engine, the electric power/power reception/output unit, and the electric motor are controlled in such a manner that the vehicle is driven by a driving force based on a required driving force, which is required to drive the vehicle, with the traveling environment taken into account more significantly than in a normal control in which the internal combustion engine, the electric power/power reception/output unit and the electric motor are controlled in such a manner that the vehicle is driven by the driving force based on the required driving force with fuel efficiency taken into account. If the detected vehicle speed is equal to or lower than a predetermined vehicle speed at the time or after the traveling environmental condition fails to be satisfied, the normal control is executed. If the detected vehicle speed is higher than the predetermined vehicle speed when the traveling environmental condition fails to be satisfied, the traveling environment reflected control is executed until the vehicle speed becomes equal to or lower than the predetermined vehicle speed.

According to the method described above, if the traveling environmental condition that is related to the environment in which the vehicle travels is satisfied, the traveling environment reflected control is executed in which the internal combustion engine, the electric power/power reception/output unit, and the electric motor are controlled in such a manner that the vehicle is driven by the driving force based on the required driving force, which is required to drive the vehicle, with the traveling environment taken into account more significantly than in a normal control in which the internal combustion engine, the electric power/power reception/output unit and the electric motor are controlled in such a manner that the vehicle is driven by the driving force based on the required driving force with fuel efficiency taken into account. Thus, it is possible to execute the control in which the traveling environment is taken into account more significantly than in the normal control. If the detected vehicle speed is equal to or lower than the predetermined vehicle speed at the time or after the traveling environmental condition fails to be satisfied, the normal control is executed. Thus, it is possible to execute the control in which the fuel efficiency is taken into account. If the detected vehicle speed is higher than the predetermined vehicle speed when the traveling environmental condition fails to be satisfied, the traveling environment reflected control is executed until the vehicle speed becomes equal to or lower than the predetermined vehicle speed. Thus, it is possible to avoid the inconveniences that may occur if the control is switched from the traveling environment reflected control to the normal control when the vehicle travels at a relatively high vehicle speed. Accordingly, it is possible to switch the control from the traveling environment reflected control to the normal control at more appropriate timing which is at the time that or after the traveling environmental condition fails to be satisfied. The traveling environmental condition may be a condition that is satisfied at least when the vehicle travels on a slope or when the vehicle goes round a curve. The predetermined vehicle speed may be a vehicle speed within a vehicle speed range in which rotation of the internal combustion engine is permitted to be stopped when the normal control is executed.

BRIEF DESCRIPTION OF THE DRAWINGS

The features, advantages, and technical and industrial significance of this invention will be described in the following description of an example embodiment of the invention with reference to the accompanying drawings wherein the same or corresponding portions will be denoted by the same reference numerals and wherein.

DETAILED DESCRIPTION OF THE EMBODIMENT

Hereafter, an example embodiment of the invention will be described with reference to accompanying drawings.

Figure 1:
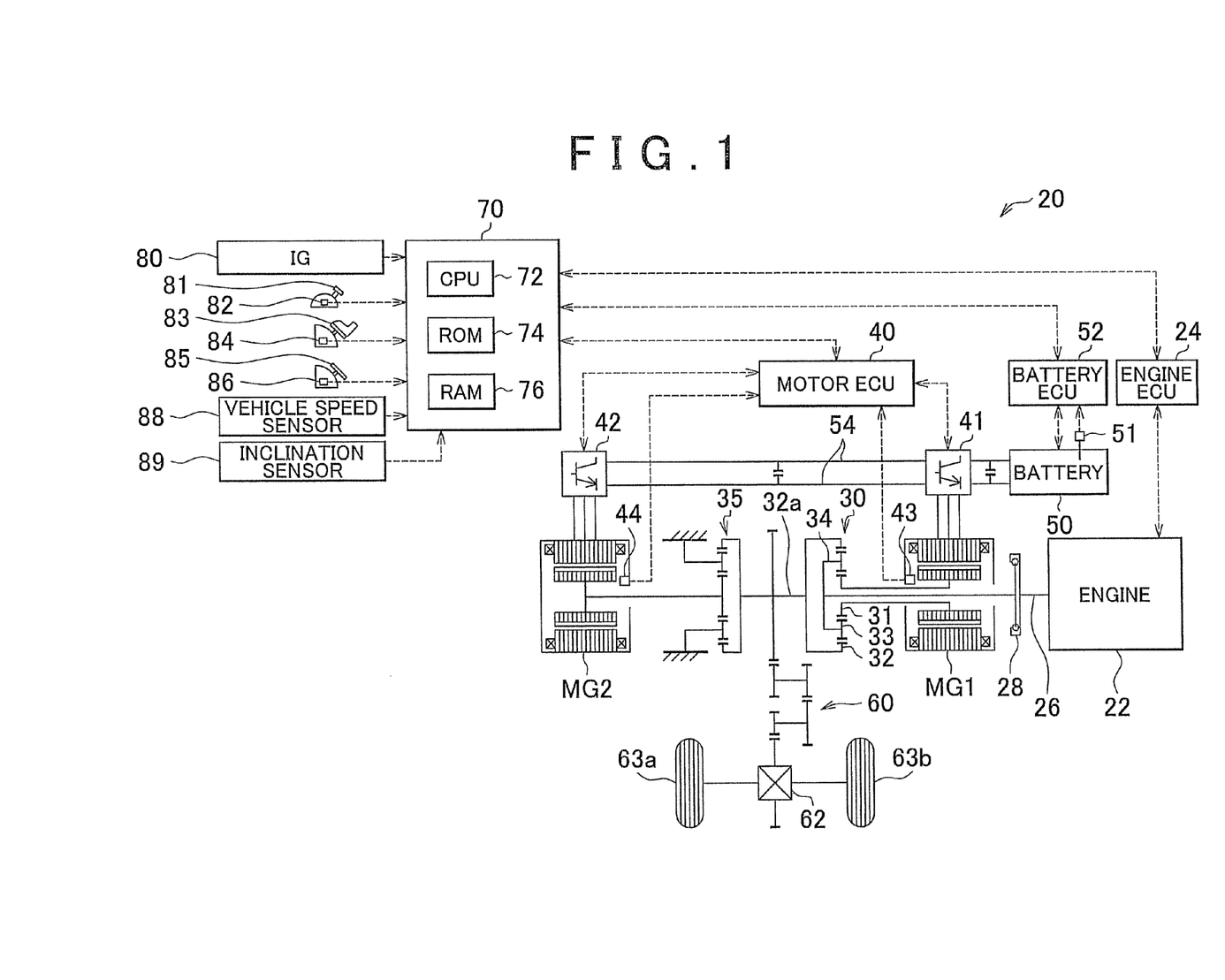
FIG. 1 is a view schematically showing the structure of a hybrid vehicle according to an embodiment of the invention.

FIG. 1 is a view schematically showing the structure of a hybrid vehicle 20 according to an embodiment of the invention. As shown in FIG. 1, the hybrid vehicle 20 includes an engine 22, a three-axis power split mechanism 30 that is connected via a damper 28 to a crankshaft 26 which serves as an output shaft of the engine 22, a motor MG1 that is connected to the power split mechanism 30 and that is able to generate electric power, a reduction gear 35 that is fitted to a ring gear shaft 32a which serves as a drive shaft connected to the power split mechanism 30, a motor MG2 that is connected to the reduction gear 35, and a hybrid electronic control unit 70 that controls the entirety of the hybrid vehicle 20.

The engine 22 is an internal combustion engine that outputs power using hydrocarbon fuel, for example, gasoline or diesel oil. An engine electronic control unit (hereinafter, referred to as an "engine ECU") 24 executes the operation controls on the engine 22, for example, the fuel injection control, the ignition control, and the intake air amount adjustment control. The engine ECU 24 receives signals from various sensors that detect the operating state of the engine 22. The engine ECU 24 receives, for example, a signal indicating a crank position from a crank position sensor (not shown) that detects a crank angle of the crankshaft 26 of the engine 22. The engine ECU 24 communicates with the hybrid ECU 70. The engine ECU 24 controls the operation of the engine 22 based on control signals from the hybrid ECU 70. The engine ECU 24 transmits the data concerning the operating state of the engine 22 to the hybrid ECU 70 when needed. The engine ECU 24 calculates a rotational speed of the crank shaft 26, that is, a rotational speed Ne of the engine 22 based on the crank position indicated by a signal from the crank position sensor (not shown).

The power split mechanism 30 is formed of a planetary gear mechanism that includes a sun gear 31 formed of an external gear, a ring gear 32 formed of an internal gear and provided coaxially with the sun gear 31, multiple pinions 33 meshed with the sun gear 31 and the ring gear 32, and a carrier 34 that supports the multiple pinions 33 in such a manner that the pinions 33 may rotate on their axes and turn around the sun gear 31. The planetary gear mechanism changes the rotational speeds among the rotational elements, that are, the sun gear 31, the ring gear 32, and the carrier 34. In the power split mechanism 30, the crankshaft 26 of the engine 22 is connected to the carrier 34, the motor MG1 is connected to the sun gear 31, and the reduction gear 35 is connected to the ring gear 32 via the ring gear shaft 32a. When the motor MG1 serves as an electric power generator, the power split mechanism 30 distributes the power, transferred from the engine 22 to the carrier 34, between the sun gear 31 and the ring gear 32 based on the gear ratio therebetween. When the motor MG1 serves as an electric motor, the power split mechanism 30 integrates the power, transferred from the engine 22 to the carrier 34, and the power, transferred from the motor MG1 to the sun gear 31. Then, the power split mechanism 30 transfers the integrated power to the ring gear 32. The power transferred to the ring gear 32 is finally transferred from the ring gear shaft 32a to drive wheels 63a and 63b of the vehicle via a gear mechanism 60 and a differential gear unit 62.

Each of the motor MG1 and the motor MG2 is formed of a known synchronous generator-motor that may serve as an electric power generator and may also serve as an electric motor. The motors MG1 and MG2 exchange electric power with a battery 50 via inverters 41 and 42, respectively. An electric power line 54 that connects the inverters 41 and 42 to the battery 50 is formed of a positive bus-bar and a negative bus-bar that are shared by the inverters 41 and 42. The electric power generated by one of the motors MG1 and MG2 may be consumed by the other of the motors MG1 and MG2. Accordingly, the motors MG1 and MG2 may generate electric power to be supplied to the battery 50, or, alternatively, the battery 50 may discharge the electric power to compensate for a shortfall in the electric power in the motors MG1 and MG2. If the electric power balance is maintained between the motor MG1 and the motor MG2, the battery 50 is not supplied with electric power or does not discharge the electric power to the motors MG1 and MG2. The motors MG1 and MG2 are both controlled by an electronic control unit for a motor (hereinafter, referred to as a "motor ECU") 40. The motor ECU 40 receives signals necessary to control the motors MG1 and MG2, for example, signals from rotational position sensors 43 and 44 that detect the rotational positions of rotors of the motors MG1 and MG2, respectively, and signals indicating the phase currents that are applied to the motors MG1 and MG2, and that are detected by current sensors (not shown). The motor ECU 40 transmits switching control signals to the inverters 41 and 42. The motor ECU 40 communicates with the hybrid ECU 70. The motor ECU 40 controls the motors MG1 and MG2 based on control signals from the hybrid ECU 70, and transmits data concerning the operating states of the motors MG1 and MG2 to the hybrid ECU 70 when needed. The motor ECU 40 calculates rotational speeds Nm1 and Nm2 of the motors MG1 and MG2 based on signals from the rotational position sensors 43 and 44, respectively.

The battery 50 is controlled by an electronic control unit for a battery (hereinafter, referred to as a "battery ECU") 52. The battery ECU 52 receives signals necessary to control the battery 50, for example, a signal indicating the voltage detected between terminals of the battery 50, which is transmitted from a voltage sensor (not shown) provided between the terminals of the battery 50, signals indicating the electric currents supplied to/discharged from the battery 50, which are transmitted from a current sensor (not shown) attached to the electric power line 54 connected to the output terminal of the battery 50, and a signal indicating a battery temperature Tb, which is transmitted from a temperature sensor 51 attached to the battery 50. The battery ECU 52 transmits, when needed, data concerning the condition of the battery 50 to the hybrid ECU 70. To control the battery 50, the battery ECU 52 calculates a state of charge (SOC) based on the value, which the current sensor has obtained by accumulating the amounts of electric currents supplied to/discharged from the battery 50. The battery ECU 52 also calculates an input limit Win, which indicates the maximum permissible electric power that may be supplied to the battery 50, and an output limit Wout, which indicates the maximum permissible electric power that may be discharged from the battery 50, based on the calculated state of charge (SOC) and the battery temperature Tb. A base value of the input limit Win and a base value of the output limit Wout are set based on the battery temperature Tb, an output limit correction coefficient and an input limit correction coefficient are set based on the state of charge (SOC) of the battery 50, and the base value of the input limit Win and the base value of the output limit Wout are multiplied by the respective correction coefficients, whereby the input limit Win and the output limit Wout for the battery 50 are set.

The hybrid ECU 70 is formed of a microprocessor that mainly includes a CPU 72. The hybrid ECU 70 includes a ROM 74 that stores processing programs, a RAM 76 that temporarily stores data, an input port (not shown), an output port (not shown), and a communication port (not shown), in addition to the CPU 72. The hybrid ECU 70 receives, via the input port, an ignition signal from an ignition switch 80, a signal indicating a shift position SP from a shift position sensor 82 that detects the position of a shift lever 81, a signal indicating an accelerator pedal operation amount Acc from an accelerator pedal position sensor 84 that detects a depression amount of an accelerator pedal 83, a signal indicating a brake pedal position BP from a brake pedal position sensor 86 that detects a depression amount of a brake pedal 85, a signal indicating a vehicle speed V from a vehicle speed sensor 88, a signal indicating a road inclination $\theta$ from an inclination sensor 89, a signal indicating a steering angle from a steering angle sensor (not shown) that detects a steering angle, etc. In the embodiment of the invention, the inclination sensor 89 detects a positive value when the vehicle is on a downhill slope, and a negative value when the vehicle is on an uphill slope. The hybrid ECU 70 is connected to the engine ECU 24, the motor ECU 40, and the battery ECU 52 via the communication port, as described above. The hybrid ECU 70 exchanges various control signals and data with the engine ECU 24, the motor ECU 40, and the battery ECU 52. In the hybrid vehicle 20 according to the embodiment of the invention, examples of the shift position SP detected by the shift position sensor 82 include Park position (P position), Neutral position (N position), Drive position (D), and Reverse position (R).

In the hybrid vehicle 20 thus configured according to the embodiment of the invention, a required torque that should be output to the ring gear shaft 32a, which serves as the drive shaft, is calculated based on the accelerator pedal operation amount Acc that corresponds to the amount by which the accelerator pedal 83 is depressed by a driver and the vehicle speed V. Then, the engine 22, the motor MG1, and the motor MG2 are controlled in such a manner that the required power that corresponds to the required torque is output to the ring gear shaft 32a. Operation control modes of the engine 22, the motor MG1, and the motor MG2 include a torque conversion operation mode, an electric power supply/discharge operation mode, and a motor operation mode. In the torque conversion operation mode, the engine 22 is controlled in such a manner that power that corresponds to the required power is output from the engine 22, and the motors MG1 and MG2 are controlled in such a manner that the entire power output from the engine 22 undergoes torque conversion by the power split mechanism 30, the motor MG1 and the motor MG2, and is then output to the ring gear shaft 32a. In the electric power supply/discharge operation mode, the engine 22 is controlled in such a manner that power that corresponds to a value, which is obtained by adding the electric power to be supplied to the battery 50 to the required power or which is obtained by subtracting the electric power to be discharged from the battery 50 from the required power, is output from the engine 22. Also, the motors MG1 and MG2 are controlled in such a manner that the entire or part of power, which is output from the engine 22 based on the amount of electric power supplied to or discharged from the battery 50, undergoes torque conversion by the power split mechanism 30, the motor MG1, and the motor MG2, and the required power is output to the ring gear shaft 32a. In the motor operation mode, the operation control is executed in such a manner that the engine 22 is stopped and power that corresponds to the required power from the motor MG2 is output to the ring gear shaft 32a.

When a predetermined traveling environmental condition is satisfied, for example, when the hybrid vehicle 20 according to the embodiment of the invention travels on a slope (an uphill slope or a downhill slope) or goes round a curve, the hybrid vehicle 20 travels in a traveling environment reflected operation mode in which the traveling environment is taken into account more significantly than in the torque conversion operation mode, the electric power supply/discharge operation mode, and the motor operation mode (hereinafter, torque conversion operation mode, electric power supply/discharge operation mode, and motor operation mode will be collectively referred to as "normal operation mode"). For example, when the hybrid vehicle 20 travels on a downhill slope with the accelerator pedal released, the engine 22, the motor MG1 and the motor MG2 are controlled in such a manner that a braking force that is larger than that in the normal operation mode is applied to the vehicle due to a braking torque that is applied to the ring gear shaft 32a by operating the engine 22, in which fuel injection is stopped, with the use of the motor MG1 (hereinafter, referred to as "engine braking" where appropriate) and a braking torque that is applied from the motor MG2 to the ring gear shaft 32a. For example, when the hybrid vehicle travels on an uphill slope or goes round a curve, the engine 22, the motor MG1 and the motor MG2 are controlled in such a manner that the required power that corresponds to the required torque, calculated based on the accelerator pedal operation amount Acc and the vehicle speed V, is output to the ring gear shaft 32a, which serves as the drive shaft, by operating the engine 22 at a rotational speed that is equal to or higher than a lower limit rotational speed based on the vehicle speed V.

Figure 2A:
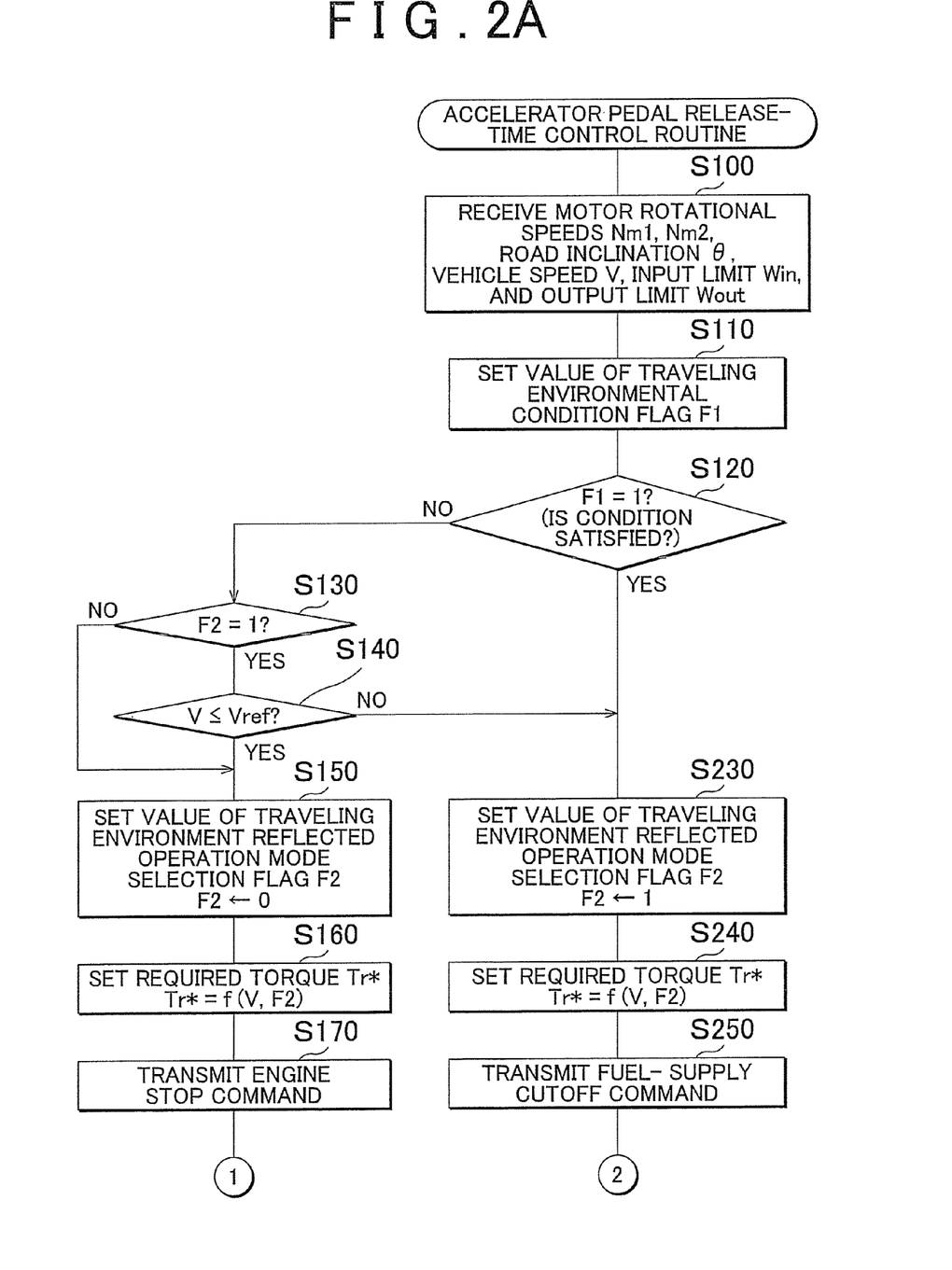
FIGS. 2A-2B are flowcharts showing an example of an accelerator pedal release-time control routine executed by a hybrid electronic control unit according to the invention.
Figure 2B:
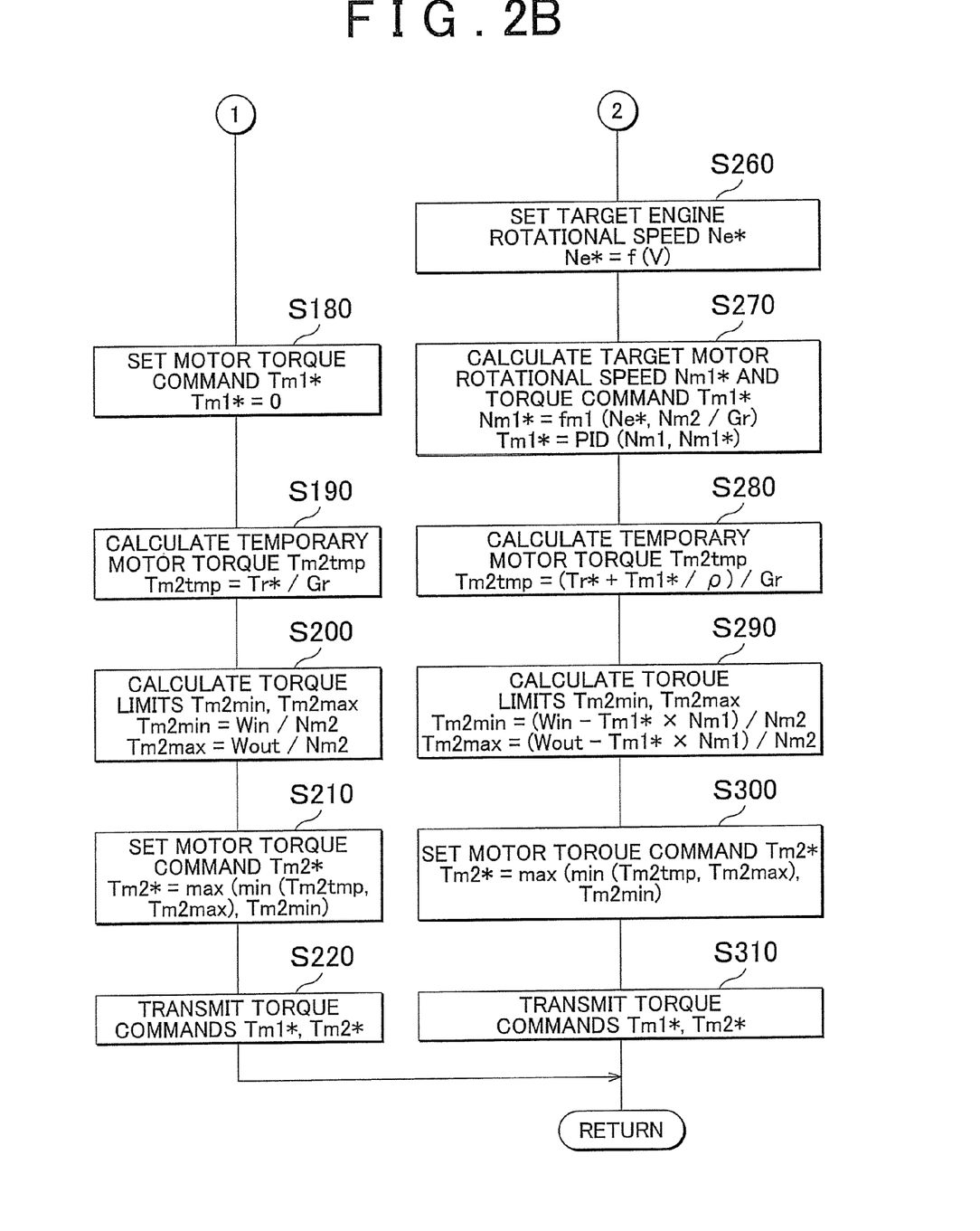

Next, the operation of the thus configured hybrid vehicle 20 according to the embodiment of the invention, especially, the operation of the hybrid vehicle 20 when the accelerator pedal, which has been depressed, is released will be described. FIG. 2 is a flowchart showing an example of an accelerator pedal release-time control routine that is executed by the hybrid ECU 70. The routine is executed at predetermined time intervals of, for example, several milliseconds after the accelerator pedal, which has been depressed, is released.

In the accelerator pedal release-time control routine, first, the CPU 72 of the hybrid ECU 70 receives data necessary to execute the control. Namely, the CPU 72 receives a signal indicating the vehicle speed V from the vehicle speed sensor 88, a signal indicating the road inclination θ from the inclination sensor 89, signals indicating the rotational speed Nm1 of the motor MG1 and the rotational speed Nm2 of the motor MG2, signals indicating the input limit Win and the output limit Wout for the battery 50, etc. (step (hereinafter, referred to as "S") 100). The rotational speeds Nm1 and Nm2 of the motors MG1 and MG2 are calculated based on the rotational positions of the rotors of the motors MG1 and MG2 that are detected by the rotational position sensors 43 and 44, respectively, and the signals indicating the calculated rotational speeds Nm1 and Nm2 are transmitted from the motor ECU 40 to the hybrid ECU 70. In addition, the input limit Win and the output limit Wout for the battery 50 are set based on the battery temperature Tb of the battery 50 and the state of charge (SOC) of the battery 50, and the signals indicating the calculated input limit Win and output limit Wout are transmitted from the battery ECU 52 to the hybrid ECU 70.

After the CPU 72 receives the data in the above-described manner, a value of a traveling environmental condition flag F1, which indicates whether the traveling environmental condition is satisfied, is set based on the road inclination θ (S110), and the thus set value of the traveling environmental condition flag F1 is checked (S120). The traveling environmental condition flag F1 is set to a value of 0 when the traveling environmental condition is not satisfied, and set to a value of 1 when the traveling environmental condition is satisfied. In the embodiment of the invention, when the accelerator pedal is released, if the hybrid vehicle 20 travels on a downhill slope of which the road inclination θ is equal to or higher than a predetermined inclination θref (e.g. 3 or 5 degrees), it is determined that the traveling environmental condition is satisfied and the traveling environmental condition flag F1 is set to 1.

Figure 3:
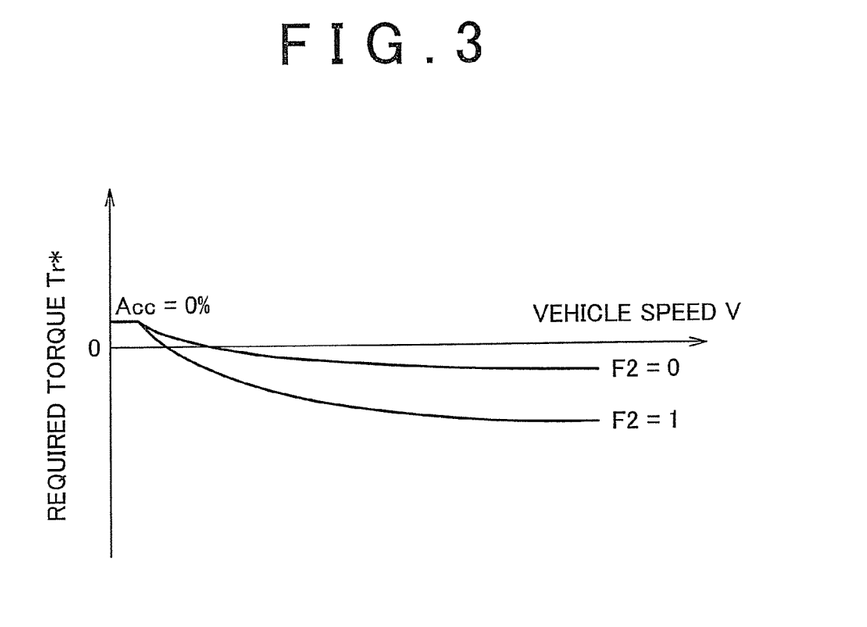
FIG. 3 is a graph showing an example of a required torque setting map.

When the traveling environmental condition flag F1 indicates 0, that is, when the traveling environmental condition is not satisfied, a value of a traveling environment reflected operation mode selection flag F2 is checked (S130). The traveling environment reflected operation mode selection flag F2 is set to a value of 1 when the hybrid vehicle 20 travels in the traveling environment reflected operation mode, and set to a value of 0 when the hybrid vehicle 20 does not travel in the traveling environment reflected operation mode (when the hybrid vehicle 20 travels in the normal operation mode). If the traveling environment reflected operation mode selection flag F2 indicates 0, it is determined that the hybrid vehicle 20 travels in the normal operation mode and the traveling environment reflected operation mode selection flag F2 is set to 0 (S150), and a required torque Tr* that should be output to the ring gear shaft 32a, which serves as the drive shaft, connected to the drive wheels 63a and 63b is set based on the vehicle speed V and the traveling environment reflected operation mode selection flag F2 as a torque required by the vehicle (S160). In the embodiment of the invention, a required torque setting map, which indicates the relationship among the vehicle speed V, the traveling environment reflected operation mode selection flag F2 and the required torque Tr* set in advance, is stored in the ROM 74, and the required torque Tr* is derived from the stored map and set when the vehicle speed V and the traveling environment reflected operation mode selection flag F2 are provided. FIG. 3 shows an example of the required torque setting map. As shown in FIG. 3, in a region of the vehicle speed V in which a creep torque is not output, the required torque Tr* is set to a lower value (a braking force is larger) when the hybrid vehicle 20 travels in the traveling environment reflected operation mode than when the hybrid vehicle 20 travels in the normal operation mode. The required torque Tr* is set in this manner in order to suppress acceleration of the vehicle on a downhill slope.

Next, a rotation stop command for stopping the rotation of the engine 22 is transmitted to the engine ECU 24 (S170), a torque command Tm1* for the motor MG1 is set to 0 (S180), and a temporary torque Tm2tmp, which is a temporary value of a torque that should be output from the motor MG2, is calculated by dividing the required torque Tr* by a gear ratio Gr of the reduction gear 35 according to Equation 1 indicated below (S190). Then, a torque limit Tm2min, which is a lower limit of the torque that may be output from the motor MG2, is calculated by dividing the input limit Win for the battery 50 by the rotational speed Nm2 of the motor MG2 according to Equation 2 indicated below, and a torque limit Tm2max, which is an upper limit of the torque that may be output from the motor MG2, is calculated by dividing the output limit Wout for the battery 50 by the rotational speed Nm2 of the motor MG2 according to Equation 3 indicated below (S200). A torque command Tm2* for the motor MG2 is set by limiting the calculated temporary torque Tm2tmp with the use of the torque limits Tm2min and Tm2max according to Equation 4 indicated below (S210). The torque command Tm1* for the motor MG1 and the torque command Tm2* for the motor MG2 are transmitted to the motor ECU 40 (S220), after which the accelerator pedal release-time control routine ends. Upon reception of the rotation stop command, the engine ECU 24 stops fuel injection in the engine 22. Upon reception of the torque commands Tm1* and Tm2*, the motor ECU 40 executes a switching control over switching elements of the inverters 41 and 42 in such a manner that the motor MG1 is driven at the torque command Tm1* and the motor MG2 is driven at the torque command Tm2*. Due to such control, the required torque Tr* is output from the motor MG2 to the ring gear shaft 32a with the rotation of the engine 22 stopped in the state where the electric power supplied to the battery 50 is equal to or smaller than the input limit Win or the electric power discharged from the battery 50 is equal to or smaller than the output limit Wout. That is, in the region of the vehicle speed V in which a creep torque is not output, a braking force is applied to the vehicle with the use of a braking torque that is output from the motor MG2 to the ring gear shaft 32a with the rotation of the engine 22 stopped.

$$Tm2\text{tmp}=Tr^*/Gr \qquad \text{Equation 1}$$

$$Tm2\text{min}=Win/Nm2 \qquad \text{Equation 2}$$

$$Tm2\text{max}=Wout/Nm2 \qquad \text{Equation 3}$$

$$Tm2^*=\max(\min(Tm2\text{tmp}, Tm2\text{max}), Tm2\text{min}) \qquad \text{Equation 4}$$

If it is determined in S120 that the traveling environmental condition flag F1 indicates 1, that is, the traveling environmental condition is satisfied, it is determined that the hybrid vehicle 20 travels in the traveling environment reflected operation mode and the traveling environment reflected operation mode selection flag F2 is set to 1 (S230). Then, the required torque Tr* is set based on the vehicle speed V and the traveling environment reflected operation mode selection flag F2 according to the required torque setting map in FIG. 3 (S240), and a fuel-supply cutoff command for cutting off a fuel supply in the engine 22 is transmitted to the engine ECU 24 (S250). Upon reception of the fuel-supply cutoff signal, the engine ECU 24 stops fuel injection in the engine 22.

Figure 4:
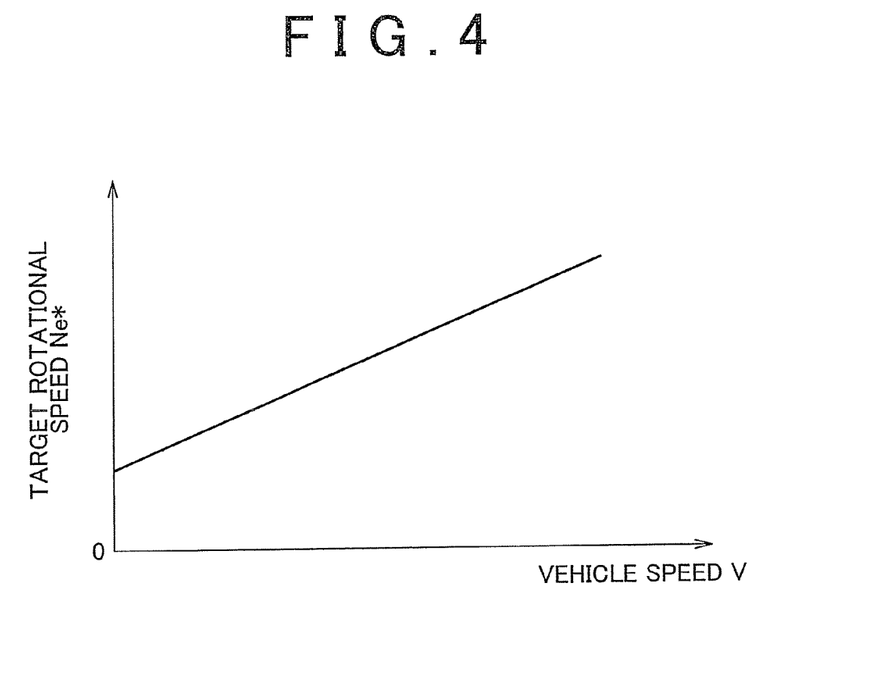
FIG. 4 is a graph showing an example of a target rotational speed setting map.
Figure 5:
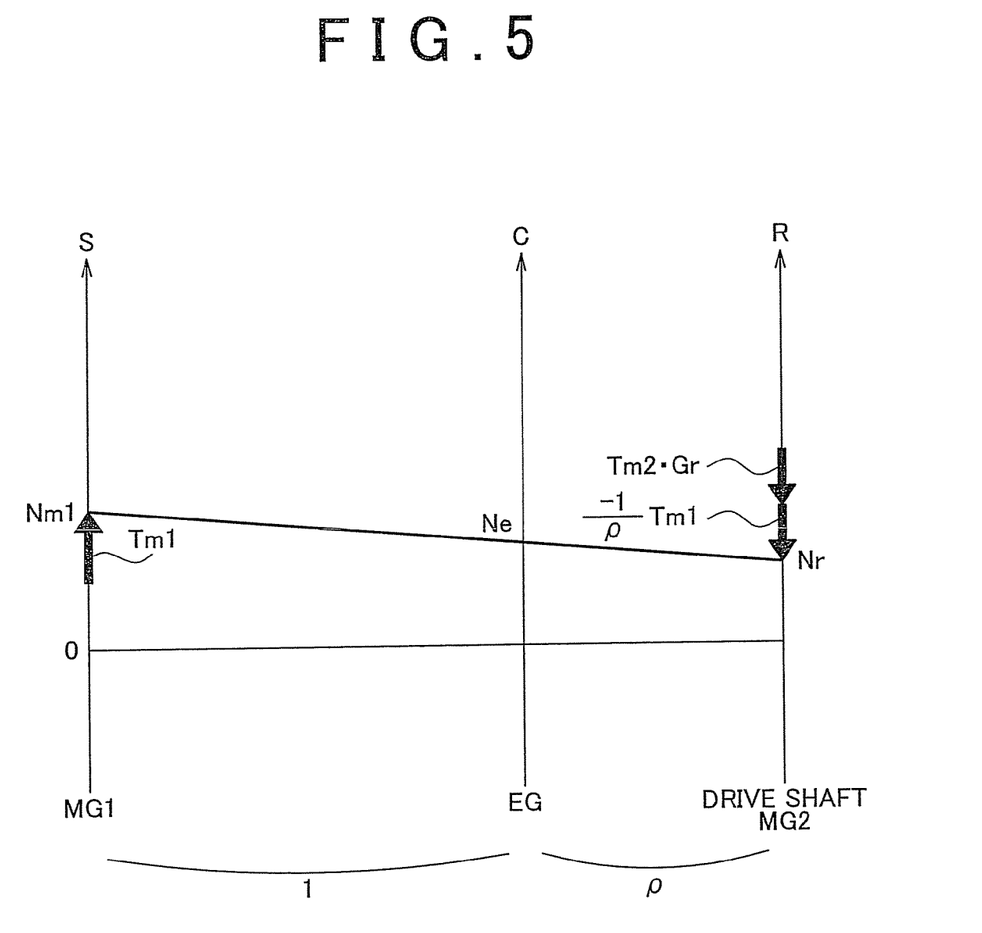
FIG. 5 is a graph showing an example of a collinear diagram that indicates a mechanical relationship between rotational speeds of rotational elements of a power split mechanism and a torque when an engine is driven by a motor with fuel injection in the engine stopped.

Next, a target rotational speed Ne* for the engine 22 is set based on the vehicle speed V (S260), and a target rotational speed Nm1* for the motor MG1 is calculated with the use of the set target rotational speed Ne* for the engine 22, the rotational speed Nm2 of the motor MG2, a gear ratio ρ of the power split mechanism 30, and the gear ratio Gr of the reduction gear 35 according to Equation 5 indicated below, and the torque command Tm1* for the motor MG1 is calculated based on the calculated target rotational speed Nm1*, the rotational speed Nm1 of the motor MG1 and the gear ratio ρ of the power split mechanism 30 according to Equation 6 indicated below (S270). According to the embodiment of the invention, a target rotational speed setting map, which indicates the relationship between the vehicle speed V and the target rotational speed Ne* for the engine 22 set in advance, is stored in the ROM 74 as a target rotational speed setting map, and the rotational speed Ne* is derived from the stored map and set when the vehicle speed V is provided. FIG. 4 shows an example of the target rotational speed setting map. In the example in FIG. 4, the target rotational speed Ne* for the engine 22 is set to a higher value as the vehicle speed V becomes higher. The target rotational speed N2* is set in this manner in order to apply a larger braking force with the use of engine braking when the vehicle speed V is relatively high than when the vehicle speed V is relatively low. Equation 5 is a mechanical relational expression for the rotational elements of the power split mechanism 30. FIG. 5 is a graph showing an example of a collinear diagram that indicates a mechanical relationship between the rotational speeds of the rotational elements of the a power split mechanism 30 and a torque when the engine 22 is driven by the motor MG1 with fuel injection in the engine 22 stopped. In FIG. 5, an axis S represents the rotational speed of the sun gear 31, which is equal to the rotational speed Nm1 of the motor MG1, an axis C represents the rotational speed Ne of the engine 22, which is equal to the rotational speed of the carrier 34, and an axis R represents a rotational speed Nr of the ring gear 32, which is obtained by dividing rotational speed Nm2 of the motor MG2 by the gear ratio Gr of the reduction gear 35. Two thick lines with arrows on the axis R represent a torque that is included in the torque Tm1 output from the motor MG1 and that is applied to the ring gear shaft 32a (engine braking) and a torque that is included in the torque Tm2 output from the motor MG2 and that is applied to the ring gear shaft 32a via the reduction gear 35. Equation 5 is easily derived with the use of this collinear diagram. Equation 6 is a relational expression used in a feedback control that is executed to rotate the motor MG1 at the target rotational speed Nm1*, that is, to rotate the engine 22 at the target rotational speed Ne*. In Equation 6, "k1" in the first term of the right side is a gain of a proportional term, and "k2" in the second term of the right side is a gain of an integral term.

$$Nm1^* = Ne^* \times (1+\rho)/\rho - Nm2/(Gr \times \rho) \quad \text{Equation 5}$$

$$Tm1^* = k1 \times (Nm1^* - Nm1) + k2 \times \int (Nm1^* - Nm1)dt \quad \text{Equation 6}$$

The temporary torque Tm2tmp, which is a temporary value of a torque that should be output from the motor MG2, is calculated by dividing a value, which is obtained by adding a value obtained by dividing the torque command Tm1* by the gear ratio ρ of the power split mechanism 30 to the required torque Tr*, by the gear ratio Gr of the reduction gear 35 according to Equation 7 indicated below (S280). Then, the torque limit Tm2min and the torque limit Tm2max are calculated by dividing the deviations of the electric power consumed (generated) by the motor MG1, obtained by multiplying the set torque command Tm1* by the current rotational speed Nm1 of the motor MG1, from the input limit Win and the output limit Wout for the battery 50 by the rotational speed Nm2 of the motor MG2 according to Equation 8 and Equation 9 indicated below, respectively (S290). Then, the torque command Tm2* for the motor MG2 is set by limiting the calculated temporary torque Tm2tmp with the use of the torque limits Tm2min and Tm2max according to Equation 10 (S300), and the torque command Tm1* for the motor MG1 and the torque command Tm2* for the motor MG2 are transmitted to the motor ECU 40 (S310), after which the accelerator pedal release-time control routine ends. Equation 7 is easily derived from the collinear diagram in FIG. 5. In this case, in the region of the vehicle speed V in which a creep torque is not output, a braking force is applied to the vehicle with the use of the engine braking and the braking torque that is output from the motor MG2 to the ring gear shaft 32a.

$$Tm2\text{tmp} = (Tr^* + Tm1^*/\rho)/Gr \quad \text{Equation 7}$$

$$Tm2\min = (Win - Tm1^* \times Nm1)/Nm2 \quad \text{Equation 8}$$

$$Tm2\max = (Wout - Tm1^* \times Nm1)/Nm2 \quad \text{Equation 9}$$

$$Tm2^* = \max(\min(Tm2\text{tmp}, Tm2\max), Tm2\min) \quad \text{Equation 10}$$

If the traveling environmental condition flag F1 is set to 0 in the state where the traveling environment reflected operation mode selection flag F2 indicates 1 (in the state where the hybrid vehicle 20 travels in the traveling environment reflected operation mode) (S110, S120), the vehicle speed V is compared with a threshold value Vref (S140) because the traveling environment reflected operation mode selection flag F2 indicates 1 (S130). The threshold value Vref is used to determine whether the hybrid vehicle 20 should continue traveling in the traveling environment reflected operation mode. In the embodiment of the invention, a vehicle speed (e.g. 45 km/h, 50 km/h or 60 km/h) within a vehicle speed range in which the rotation of the engine 22 is permitted to be stopped when the hybrid vehicle 20 travels in the normal operation mode (in the embodiment of the invention, the entire vehicle speed range is used for simplicity) is used as the threshold value Vref.

If the vehicle speed V is equal to or lower than the threshold value Vref, it is determined that the hybrid vehicle 20 travels in the normal operation mode, and the traveling environment reflected operation mode selection flag F2 is set to 0 (S150), and S160 to S220 are executed, after which the accelerator pedal release-time control routine ends. Thus, the required torque Tr* is output from the motor MG2 to the ring gear shaft 32a with the rotation of the engine 22 stopped in the state where the electric power supplied to the battery 50 is equal to or smaller than the input limit Win or the electric power discharged from the battery 50 is equal to or smaller than the output limit Wout. Therefore, it is possible to suppress the amount of electric power consumed by the motor MG1 when the engine 22 is operated by the motor MG1. As a result, it is possible to improve the energy efficiency.

In the case where the traveling environment reflected operation mode selection flag F2 is set to 0 in the above-described manner, if the traveling environmental condition flag F1 indicates 0 (S110, S120) when the accelerator pedal release-time control routine in FIG. 2 is executed next time and thereafter, it is determined that the hybrid vehicle 20 travels in the normal operation mode and the traveling environment reflected operation mode selection flag F2 is set to 0 (S150) because the traveling environment reflected operation mode selection flag F2 indicates 0 (S130). Then, S160 to S220 are executed, after which the accelerator pedal release-time control routine ends.

On the other hand, if it is determined in S140 that the vehicle speed V is higher than the threshold value Vref, it is determined that the hybrid vehicle 20 travels in the traveling environment reflected operation mode (the hybrid vehicle 20 continues travel in the traveling environment reflected operation mode), and the traveling environment reflected operation mode selection flag F2 is set to 1 (S230). Then, S240 to S310 are executed, after which the accelerator pedal release-time control routine ends. Thus, it is possible to minimize inconveniences that may occur if the operation mode is switched from the traveling environment reflected operation mode to the normal operation mode when the hybrid vehicle 20 travels at a relatively high vehicle speed with the accelerator pedal released, for example, shock that may be caused due to a change in a braking force that is applied to the vehicle. In addition, at this time, it is possible to apply a braking force to the vehicle with the use of the engine braking and the braking torque output from the motor MG2 to the ring gear shaft 32a. Then, when the vehicle speed V becomes equal to or lower than the threshold value Vref (S140), it is determined that the hybrid vehicle 20 travels in the normal operation mode and the traveling environment reflected operation mode selection flag S2 is set to 0 (S150). Then, S160 to S220 are executed, after which the accelerator pedal release-time control routine ends. The operation mode may be switched to the normal operation mode, for example, in the case where the accelerator pedal is depressed in addition to the case where the vehicle speed V becomes equal to or lower than the threshold value Vref.

Figure 6:
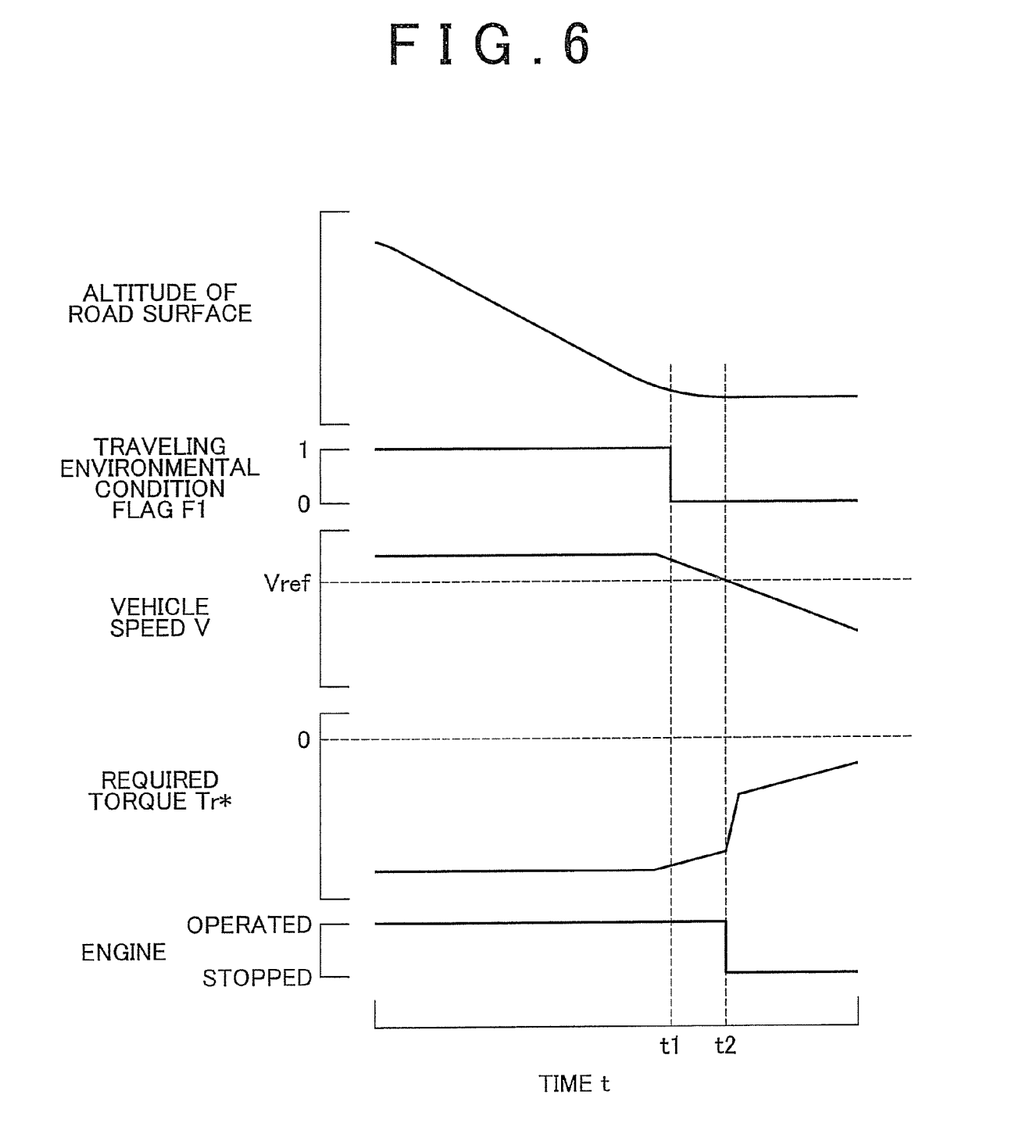
FIG. 6 is a graph showing temporal changes in an altitude of a road surface, a traveling environmental condition flag, a vehicle speed, a required torque, and a state of the engine when a vehicle travels on a downhill slope and a flat road contiguous to the downhill slope with an accelerator pedal released.

FIG. 6 is a graph showing temporal changes in the altitude of the road surface, the traveling environmental condition flag F1, the vehicle speed V, the required torque Tr*, and the state of the engine 22 when the hybrid vehicle 20 travels on a downhill slope and a flat road contiguous to the downhill slope with the accelerator pedal released. As shown in FIG. 6, when the hybrid vehicle 20 travels on the downhill slope, because the traveling environmental condition is satisfied (the traveling environmental condition flag F1 indicates 1), the traveling environment reflected operation mode is selected. Thus, a braking force is applied to the vehicle with the use of the engine braking and the braking torque that is output from the motor MG2 to the ring gear shaft 32a. Then, if the vehicle speed V is higher than the threshold value Vref when the traveling environmental condition fails to be satisfied because the hybrid vehicle has come out of the downhill slope and enters the flat road (when the value indicated by the traveling environmental condition flag F1 is changed to 0) (time t1), a braking force is applied to the vehicle with the use of the engine braking and the braking torque that is output from the motor MG2 to the ring gear shaft 32a until the vehicle speed V becomes equal to or lower than the threshold value Vref. Thus, it is possible to minimize inconveniences that may occur if the operation mode is switched from the traveling environment reflected operation mode to the normal operation mode when the hybrid vehicle 20 travels at a relatively high vehicle speed. At or after time t2 at which the vehicle speed V becomes equal to or lower than the threshold value Vref, the rotation of the engine 22 is stopped and a braking force is applied to the vehicle with the use of the braking torque that is output from the motor MG2 to the ring gear shaft 32a. Thus, it is possible to improve the energy efficiency. As described above, the operation mode is switched from the traveling environment reflected operation mode to the normal operation mode when the vehicle speed V becomes equal to or lower than the threshold value Vref at the time that or after the traveling environmental condition falls to be satisfied. Therefore, it is possible to switch the operation mode at more appropriate timing.

When the traveling environmental condition is satisfied with the accelerator pedal released, the hybrid vehicle 20 according to the embodiment of the invention described above travels in the traveling environment reflected operation mode in which the engine 22 and the motors MG1 and MG2 are controlled in such a manner that a braking force based on the required torque Tr* is applied to the hybrid vehicle 20 with the use of the braking torque that is applied to the ring gear shaft 32a by operating the engine 22, in which fuel injection is stopped, with the use of the motor MG1 (engine braking) and the braking torque that is output from the motor MG2 to the ring gear shaft 32a. Therefore, it is possible to apply a braking force to the vehicle with the use of the engine braking and the braking torque that is output from the motor MG2 to the ring gear shaft 32a. If the vehicle speed V is equal to or lower than the threshold value Vref at the time that or after the traveling environmental condition fails to be satisfied with the accelerator pedal released, the hybrid vehicle 20 travels in the normal operation mode in which the engine 22 and the motor MG1 and MG2 are controlled in such a manner that the braking force based on the required torque Tr* is applied to the vehicle with the use of the braking torque that is output from the motor MG2 to the ring gear shaft 32a with the rotation of the engine 22 stopped. Accordingly, it is possible to improve the energy efficiency. If the vehicle speed V is higher than the threshold value Vref when the traveling environmental condition fails to be satisfied with the accelerator pedal released, the hybrid vehicle 20 travels in the traveling environment reflected operation mode until the vehicle speed V becomes equal to or lower than the threshold value Vref. Therefore, it is possible to minimize the inconveniences that may occur if the operation mode is switched from the traveling environment reflected operation mode to the normal operation mode when the hybrid vehicle 20 travels at a relatively high vehicle speed with the accelerator pedal released. As a result, it is possible to switch the operation mode from the traveling environment reflected operation mode to the normal operation mode at more appropriate timing which is at the time that or after the traveling environmental condition fails to be satisfied.

In the hybrid vehicle 20 according to the embodiment of the invention, the traveling environmental condition is satisfied when the vehicle 20 travels on a slope (an uphill slope or a downhill slope) or goes round a curve (in the control routine in FIG. 2, it is determined that the traveling environmental condition is satisfied when the hybrid vehicle is on a downhill slope of which the road inclination θ is equal to or higher than the predetermined inclination θref). For example, in a hybrid vehicle including a navigation system in which road information, etc. on each of the predetermined traveling regions (for example, regions between traffic lights or regions between intersections), it may be determined that the traveling environmental condition is satisfied when a flag that indicates that the hybrid vehicle travels in a certain traveling region (for example, a region in transition from a highway to an open road) is received from the navigation system via communication. Examples of the road information include distance information, road width information, area information (whether the hybrid vehicle travels in an urban area or a suburban area), road type information (whether the hybrid vehicle travels in an open road or a highway), inclination information, and legal speed information.

When the hybrid vehicle 20 according to the embodiment of the invention travels in the normal operation mode with the accelerator pedal released, a braking force is applied to the vehicle with the use of the braking torque that is output from the motor MG2 to the ring gear shaft 32a with the rotation of the engine 22 stopped regardless of the vehicle speed V. Alternatively, when the vehicle speed V is equal to or higher than a threshold value Vref2 that is equal to or higher than the threshold value Vref, a braking force may be applied to the vehicle with the use of the engine braking and the braking torque that is output from the motor MG2 to the ring gear shaft 32a.

When the hybrid vehicle 20 according to the embodiment of the invention travels in the traveling environment reflected operation mode with the accelerator pedal released, the target rotational speed Ne* for the engine 22 is set based on the vehicle speed V. Alternatively, the target rotational speed Ne* for the engine 22 may be set based on other parameters such as the road inclination θ and the road information from the navigation system, if it is included in the hybrid vehicle, instead of or in addition to the vehicle speed V. When the target rotational speed Ne* for the engine 22 is set based on the vehicle speed V and the road inclination θ, the target rotational speed Ne* may be set to a higher value as the vehicle speed V becomes higher and the road inclination θ of the downhill slope becomes higher. The target rotational speed Ne* is set in this manner in order to apply a larger braking force with the use of the engine braking as the vehicle speed V is higher and the road inclination θ of the downhill slope is higher.

In the embodiment of the invention, the control executed over the hybrid vehicle 20 with the accelerator pedal released is described. When the accelerator pedal is depressed, the required torque Tr* may be set based on the accelerator pedal operation amount Acc, the vehicle speed V and the traveling environmental condition flag F1, and a required power Pe* that is required of the engine 22 may be set to the sum of the set required torque Tr*, the rotational speed Nr of the ring gear shaft 32a (=Nm2/Gr), a charge/discharge required power Pb* that is required by the battery 50 and a loss Loss. When the hybrid vehicle 20 travels in the normal operation mode, the engine 22 and the motors MG1 and MG2 may be controlled in such a manner that the required torque Tr* is output to the ring gear shaft 32a in the state where the engine 22 is intermittently operated based on the required power Pe* and the electric power supplied to the battery 50 is equal to or smaller than the input limit Win or the electric power discharged from the battery 50 is equal to or smaller than the output limit Wout. When the hybrid vehicle 20 travels in the traveling environment reflected operation mode, a lower limit rotational speed Nemin for the engine 22 may be set based on the vehicle speed V, and the engine 22 and the motors MG1 and MG2 may be controlled in such a manner that the required torque Tr* is output to the ring gear shaft 32a in the state where the engine 22 is operated at a rotational speed of equal to or higher than the lower limit rotational speed Nemin and the electric power supplied to the battery 50 is equal to or smaller than the input limit Win or the electric power discharged from the battery 50 is equal to or smaller than the output limit Wout. The lower limit rotational speed Nemin may be set to a higher value as the vehicle speed V becomes higher.

In the embodiment of the invention, the control that is executed over the hybrid vehicle 20 when the accelerator pedal, which has been depressed, is released is described. When the accelerator pedal is released and the brake pedal is depressed, the required torque Tr* may be set based on the accelerator pedal operation amount Acc, the brake pedal position BP, the vehicle speed V and the traveling environmental condition flag F1, and the engine 22 and the motors MG1 and MG2 may be controlled in such a manner that the required torque Tr* is output to the ring gear shaft 32a in the state where the electric power supplied to the battery 50 is equal to or smaller than the input limit Win or the electric power discharged from the battery 50 is equal to or smaller than the output limit Wout, when the hybrid vehicle 20 travels in the normal operation mode or the traveling environment reflected operation mode.

In the hybrid vehicle 20 according to the embodiment of the invention, the motor MG2 is fitted to the ring gear shaft 32a, which serves as a drive shaft, via the reduction gear 35. Alternatively, the motor MG2 may be directly fitted to the ring gear shaft 32a, or the motor MG 2 may be fitted to the ring gear shaft 32a via a two-speed, three-speed, or four speed transmission instead of via the reduction gear 35.

Figure 7:
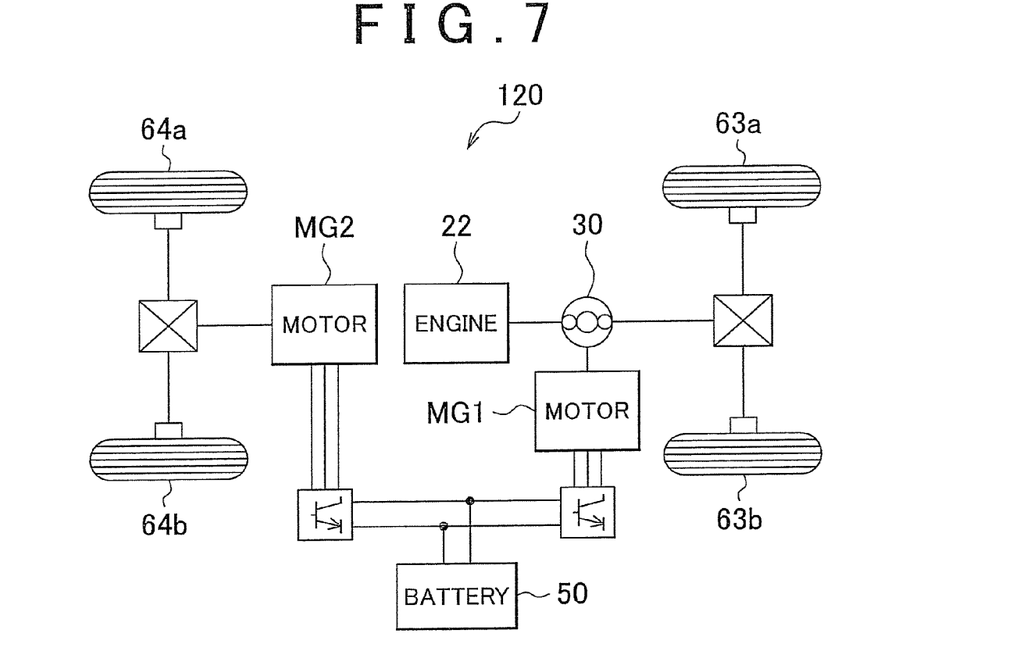
FIG. 7 is a view schematically showing the structure of a hybrid vehicle according to a modification of the embodiment of the invention.

In the hybrid vehicle 20 according to the embodiment of the invention, the power from the motor MG2 is output to the ring gear shaft 32a while the rotational speed of the motor MG2 is changed by the reduction gear 35. Alternatively, as shown in a hybrid vehicle 120 according to a modification of the embodiment shown in FIG. 7, the power from the motor MG2 may be output to an axle (axle connected to wheels 64a and 64b in FIG. 7) that differs from an axle (axle connected to the drive wheels 63a and 63b) to which the ring gear shaft 32a is connected.

Figure 8:
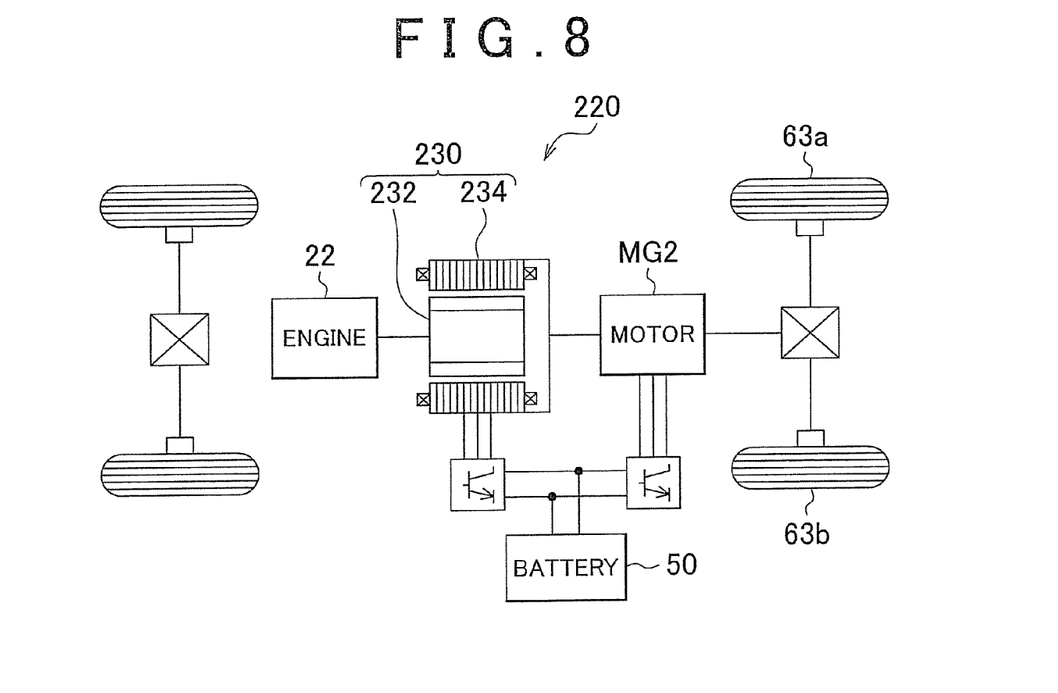
FIG. 8 is a view schematically showing the structure of a hybrid vehicle according to another modification of the embodiment of the invention.

In the hybrid vehicle 20 according to the embodiment of the invention, the power from the engine 22 is output, via the power split mechanism 30, to the ring gear shaft 32a, which serves as a drive shaft, connected to the drive wheels 63a and 63b. Alternatively, as shown in a hybrid vehicle 220 according to another modification of the embodiment of the invention, a paired rotor electric motor 230 may be provided. The paired rotor electric motor 230 includes an inner rotor 232 connected to the crankshaft 26 of the engine 22 and an outer rotor 234 connected to the drive shaft that outputs the power to the drive wheels 63a and 63b. The paired rotor electric motor 230 outputs part of the power from the engine to the drive shaft and converts the remaining power into the electric power.

The invention may be applied not only to automobiles but also to vehicles other than automobiles, for example, trains. The invention may be implemented in the form of drive units that are mounted in vehicles, or in the form of methods for controlling vehicles.

The engine 22, the combination of the power split mechanism 30 and the motor MG1, the motor MG2, the battery 50, and the vehicle speed sensor 88 in the embodiment described above may function as an internal combustion engine, an electric power/power reception/output unit, an electric motor, an electric power storage unit, and a vehicle speed detection unit in the invention, respectively. The hybrid ECU 70, the engine ECU 24, and the motor ECU 40 may function as a control unit in the invention. The hybrid ECU 70 executes the accelerator pedal release-time control routine in FIG. 2. The accelerator pedal release-time control routine will be briefly described below. If the traveling environmental condition is satisfied when the accelerator pedal is released, the fuel-supply cutoff command is transmitted to engine ECU 24 and the torque command Tm1* for the motor MG1 and the torque command Tm2* for the motor MG2 are set and transmitted to the motor ECU 40 so that the braking force based the required torque Tr* is applied to the vehicle with the use of the braking torque that is applied to the ring gear shaft 32a when the engine 22, in which fuel injection is stopped, is operated by the motor MG1 (engine braking) and the braking torque that is output from the motor MG2 to the ring gear shaft 32a. If the vehicle speed V is equal to or lower than the threshold value Vref at the time that or after the traveling environmental condition fails to be satisfied, the rotation stop command is transmitted to the engine ECU 24 and the torque command Tm1* for the motor MG1 and the torque command Tm2* for the motor MG2 are set and transmitted to the motor ECU 40 so that the braking force based on the required torque Tr* is applied to the vehicle with the use of the braking torque that is output from the motor MG2 to the ring gear shaft 32a with the rotation of the engine 22 stopped. If the vehicle speed V is higher than the threshold value Vref when the traveling environmental condition fails to be satisfied, the fuel-supply cutoff command is transmitted to the engine ECU 24 and the torque command Tm1* for the motor MG1 and the torque command Tm2* for the motor MG2 are set and transmitted to the motor ECU 40 so that the braking force based on the required torque Tr* is applied to the vehicle with the use of the engine braking and the braking torque that is output from the motor MG2 to the ring gear shaft 32a until the vehicle speed becomes equal to or lower than the threshold value Vref. The engine ECU 24 stops fuel injection in the engine 22 upon reception of the rotation stop command or the fuel-supply cutoff command. The motor ECU 40 controls the motor MG1 and the motor MG2 based on the torque command Tm1* and the torque command Tm2*, respectively. The motor MG1 in the embodiment may function as an electric power generator in the invention, and the power split mechanism 30 in the embodiment may function as a three-axis power reception/output unit in the invention. The paired rotor electric motor 230 may also function as the electric power/power reception/output unit.

The internal combustion engine in the invention is not limited to the internal combustion engine that outputs power with the use of hydrocarbon fuel, for example, gasoline or diesel oil. Any types of internal combustion engines such as a hydrogen engine may be used as the internal combustion engine in the invention. The electric power/power reception/output unit in the invention is not limited to the combination of the motor MG1 and the power split mechanism 30 or the paired rotor electric motor 230. Any types of unit may be used as the electric power/power reception/output unit in the invention, as long as the unit is connected to an axle-side shaft and connected to the output shaft of the internal combustion engine in such a manner that the unit may rotate independently of the axle-side shaft, and receives power from the output shaft and outputs the power to the axle-side shaft or receives power from the axle-side shaft and outputs the power to the output shaft while exchanging electric power with the electric power storage unit and exchanging power with the internal combustion engine. The electric motor in the invention is not limited to the motor MG2 that is formed as a synchronous generator-motor. Any types of electric motor, for example, an induction motor may be used as the electric motor in the invention, as long as the electric motor may receive power from the axle-side shaft or output power to the axle-side shaft. The electric power storage unit in the invention is not limited to the battery 50 that serves as a secondary battery. Any types of unit, for example, a capacitor may be used as the electric power storage unit in the invention, as long as the unit may exchange electric power with the electric power/power reception/output unit and the electric motor. The vehicle speed detection unit in the invention is not limited to the vehicle speed sensor 88. The vehicle speed detection unit may be any types of unit that detects the vehicle speed, for example, a unit that calculates the vehicle speed V based on the rotational speed of the ring gear shaft 32a that serves as a drive shaft or a unit that calculates the vehicle speed V based on a signal from wheel speed sensors fitted to the drive wheels 63a and 63b and driven wheels. The control unit in the invention is not limited to the combination of the hybrid ECU 70, the engine ECU 24 and the motor ECU 40. The control unit in the invention may be formed of a single electronic control unit. The control unit is not limited to the control unit that executes, if the traveling environmental condition is satisfied when the accelerator pedal is released, the traveling environment reflected operation mode, in which the engine 22 and the motors MG1 and MG2 are controlled in such a manner that the braking force based on the required torque Tr* is applied to the vehicle with the use of the braking torque that is applied to the ring gear shaft 32a when the engine 22, in which fuel injection is stopped, is operated by the motor MG1 (engine braking) and the braking torque that is output from the motor MG2 to the ring gear shaft 32a, that executes, if the vehicle speed V is equal to or lower than the threshold value Vref at the time or after the traveling environmental condition fails to be satisfied, the normal operation mode, in which the engine 22 and the motors MG1 and MG2 are controlled in such a manner that the braking force based on the required torque Tr* is applied to the vehicle with the use of the braking torque that is output from the motor MG2 to the ring gear shaft 32a with the rotation of the engine 22 stopped, and that executes, if the vehicle speed V is higher than the threshold value Vref when the traveling environmental condition fails to be satisfied, the traveling environment reflected mode until the vehicle speed V becomes equal to or lower than the threshold value Vref. The control unit in the invention may be any types of control unit, as long as the control unit executes, when the traveling environmental condition is satisfied, the traveling environment reflected control in which the internal combustion engine, the electric power/power reception/output unit and the electric motor are controlled in such a manner that the vehicle travels with the use of the driving force based on the required driving force with the traveling environment taken into account more significantly than in the normal control in which the internal combustion engine the electric power/power reception/output unit and the electric motor are controlled, with the fuel efficiency taken into account, with the use of the driving force based on the required driving force that is required to travel, executes the normal control if the vehicle speed is equal to or lower than the predetermined vehicle speed at the time or after the traveling environmental condition fails to be satisfied, and executes, if the vehicle speed is higher than the predetermined vehicle speed when the traveling environmental condition fails to be satisfied, the traveling environment reflected control until the vehicle speed becomes equal to or lower than the predetermined vehicle speed. The electric motor in the invention is not limited to the motor MG1 that is formed of a synchronous electric motor. Any types of electric motor that may be receive power or output power, for example, an induction electric motor may be used as the electric motor in the invention. The three-axis power reception/output unit in the invention is not limited to the above-described power split mechanism. The three-axis power reception/output unit in the invention may be any types of unit that is connected to three shafts, which are the drive shaft, the output shaft, and the rotating shaft of the electric motor, and that receives or outputs, based on power received from or output to any two of the three shafts, power from or to the remaining shaft. The three-axis power reception/output unit in the invention may be, for example, a unit that uses a double-pinion planetary gear mechanism, a unit that uses combination of multiple planetary gear mechanisms and that is connected to four or more shafts, or a unit, for example, a differential gear unit, that has a differential effect which differs from that of a planetary gear mechanism.

While the invention has been described with reference to what are considered to be an example embodiment thereof, it is to be understood that the invention is not limited to the described embodiment. On the contrary, the invention may be implemented in various other embodiments within the scope of the invention.

The invention may be employed in, for example, industries of producing vehicles and drive units.

What is claimed is:

1. A vehicle, comprising:
   an internal combustion engine;
   an electric power storage unit;
   an electric power/power reception/output unit that is connected to an axle-side shaft and connected to an output shaft of the internal combustion engine in such a manner that the electric power/power reception/output unit rotates independently of the axle-side shaft, and that receives power from the output shaft and outputs the power to the axle-side shaft or receives power from the axle-side shaft and outputs the power to the output shaft while exchanging electric power with the electric power storage unit and exchanging power with the internal combustion engine;
   an electric motor that receives power from the axle-side shaft or outputs power to the axle-side shaft, and that exchanges electric power with the electric power storage unit;
   a vehicle speed detection unit that detects a vehicle speed; and
   a control unit, wherein
   if a traveling environmental condition that is related to an environment in which the vehicle travels is satisfied, the control unit executes a traveling environment reflected control in which the internal combustion engine, the electric power/power reception/output unit, and the electric motor are controlled in such a manner that the vehicle is driven by a driving force based on a required driving force, which is required to drive the vehicle, with the traveling environment taken into account more significantly than in a normal control in which the internal combustion engine, the electric power/power reception/ output unit and the electric motor are controlled in such a manner that the vehicle is driven by the driving force based on the required driving force with fuel efficiency taken into account,
   if the detected vehicle speed is equal to or lower than a predetermined vehicle speed at the time or after the traveling environmental condition fails to be satisfied, the control unit executes the normal control, and
   if the detected vehicle speed is higher than the predetermined vehicle speed when the traveling environmental condition fails to be satisfied, the control unit executes the traveling environment reflected control until the vehicle speed becomes equal to or lower than the predetermined vehicle speed.

2. The vehicle according to claim 1, wherein:
when the control unit executes the traveling environment reflected control, the control unit controls the internal combustion engine, the electric power/power reception/output unit and the electric motor in such a manner that the vehicle is driven by the driving force based on the required driving force with rotation of the internal combustion engine continued; and
when the control unit executes the normal control, the control unit controls the internal combustion engine, the electric power/power reception/output unit and the electric motor in such a manner that the vehicle is driven by the driving force based on the required driving force with the internal combustion engine operated intermittently.

3. The vehicle according to claim 2, wherein:
if the required driving force is a braking force, when the control unit executes the traveling environment reflected control, the control unit controls the internal combustion engine, the electric power/power reception/output unit and the electric motor in such a manner that the vehicle is driven by the driving force based on the required driving force in a state where the internal combustion engine, in which fuel injection is stopped, is operated by the electric power/power reception/output unit; and
if the required driving force is a braking force, when the control unit executes the normal control, the control unit controls the internal combustion engine, the electric power/power reception/output unit and the electric motor in such a manner that the vehicle is driven by the driving force based on the required driving force with rotation of the internal combustion engine stopped.

4. The vehicle according to claim 2, wherein if an accelerator pedal is released, the control unit controls the internal combustion engine, the electric power/power reception/output unit and the electric motor in such a manner that the vehicle is driven by the driving force based on the required driving force which tends to be larger as a braking force when the traveling environment reflected control is executed than when the normal control is executed.

5. The vehicle according to claim 3, wherein if an accelerator pedal is released, the control unit controls the internal combustion engine, the electric power/power reception/output unit and the electric motor in such a manner that the vehicle is driven by the driving force based on the required driving force which tends to be larger as a braking force when the traveling environment reflected control is executed than when the normal control is executed.

6. The vehicle according to claim 1, wherein the predetermined vehicle speed is a vehicle speed within a vehicle speed range in which rotation of the internal combustion engine is permitted to be stopped when the normal control is executed.

7. The vehicle according to claim 1, wherein the traveling environmental condition is a condition that is satisfied at least when the vehicle travels on a slope or when the vehicle goes round a curve.

8. The vehicle according to claim 1, wherein the electric power/power reception/output unit includes an electric motor which receives or outputs power and a three-axis power reception/output unit that is connected to three shafts which are the axle-side shaft, the output shaft, and a rotating shaft of the electric motor, and that receives or outputs, based on power received from or output to any two of the three shafts, power from or to the remaining shaft.

9. A drive unit that is mounted together with an internal combustion engine and a storage unit in a vehicle, comprising:
an electric power/power reception/output unit that is connected to an axle-side shaft and connected to an output shaft of the internal combustion engine in such a manner that the electric power/power reception/output unit rotates independently of the axle-side shaft, and that receives power from the output shaft and outputs the power to the axle-side shaft or receives power from the axle-side shaft and outputs the power to the output shaft while exchanging electric power with the electric power storage unit and exchanging power with the internal combustion engine;
an electric motor that exchanges electric power with the electric power storage unit and that receives power from the axle-side shaft or outputs power to the axle-side shaft;
a vehicle speed detection unit that detects a vehicle speed; and
a control unit, wherein
if a traveling environmental condition that is related to an environment in which the vehicle travels is satisfied, the control unit executes a traveling environment reflected control in which the internal combustion engine, the electric power/power reception/output unit, and the electric motor are controlled in such a manner that the vehicle is driven by a driving force based on a required driving force, which is required to drive the vehicle, with the traveling environment taken into account more significantly than in a normal control in which the internal combustion engine, the electric power/power reception/output unit and the electric motor are controlled in such a manner that the vehicle is driven by the driving force based on the required driving force with fuel efficiency taken into account,
if the detected vehicle speed is equal to or lower than a predetermined vehicle speed at the time or after the traveling environmental condition fails to be satisfied, the control unit executes the normal control, and
if the detected vehicle speed is higher than the predetermined vehicle speed when the traveling environmental condition fails to be satisfied, the control unit executes the traveling environment reflected control until the vehicle speed becomes equal to or lower than the predetermined vehicle speed.

\* \* \* \* \*